United States Patent
Hodge (10) Patent No.: US 10,364,698 B2
(45) Date of Patent: Jul. 30, 2019

(54) SYSTEM AND METHOD OF NON-INTRUSIVE THRUST MEASUREMENT

(71) Applicant: Rolls-Royce North American Technologies, Inc., Indianapolis, IN (US)

(72) Inventor: C. Edward Hodge, Plainfield, IN (US)

(73) Assignee: ROLLS-ROYCE NORTH AMERICAN TECHNOLOGIES, INC., Indianapolis, IN (US)

(*) Notice: Subject to any disclaimer, the term of this patent is extended or adjusted under 35 U.S.C. 154(b) by 92 days.

(21) Appl. No.: 15/617,028

(22) Filed: Jun. 8, 2017

(65) Prior Publication Data

US 2017/0356303 A1   Dec. 14, 2017

Related U.S. Application Data

(60) Provisional application No. 62/348,684, filed on Jun. 10, 2016.

(51) Int. Cl.
    *F01D 21/00* (2006.01)
    *G01F 1/00* (2006.01)
    (Continued)

(52) U.S. Cl.
    CPC ........... *F01D 21/003* (2013.01); *G01F 1/667* (2013.01); *G01L 5/133* (2013.01); *G01M 15/00* (2013.01);
    (Continued)

(58) Field of Classification Search
    CPC .......... F01D 21/00; F01D 21/003; G01F 1/00; G01F 1/86; G01F 1/661; G01F 1/667;
    (Continued)

(56) References Cited

U.S. PATENT DOCUMENTS

| 4,537,066 A | 8/1985 | Simpson | |
|---|---|---|---|
| 5,178,002 A | 1/1993 | Hanson | |
| 5,293,775 A * | 3/1994 | Clark | F02C 7/04 73/116.03 |
| 6,851,303 B2 * | 2/2005 | Parfitt | F01D 21/003 73/112.01 |

(Continued)

FOREIGN PATENT DOCUMENTS

EP      1860416 A2    11/2007

OTHER PUBLICATIONS

European Patent Office, European Extended Search Report for corresponding EP Application No. 17175331.2 dated Jan. 29, 2018, 2 pgs.
"General Thrust Equation", May 5, 2015, XP055420276 Retrieved from the internet URL: https://www.grc.nasa.gov/www/k-12/airplane/thrsteq.html, retrieved Oct. 31, 2017.

*Primary Examiner* — Yonel Beaulieu
(74) *Attorney, Agent, or Firm* — Duane Morris LLP (57) ABSTRACT

A system and method of non-intrusive thrust measurement of a gas turbine engine. The system comprises a transmitter disposed at a boundary of fluid flow and at least one receiver adapted to receive transmissions from the transmitter. A processor is coupled to the receivers to determine a parameter from a characteristic of the transmission at the receiver suite and adapted to determine a thrust parameter from the parameter. A method for non-intrusively measuring engine thrust includes transmitting a wave across the exhaust plume, receiving the transmitted wave and determining a measurement parameter of the exhaust plume based on a characteristic of the received wave, and comparing the measurement parameter to a reference parameter and determining the thrust based on the comparison.

4 Claims, 10 Drawing Sheets

(51) Int. Cl.
  G01L 5/00 (2006.01)
  G01P 5/00 (2006.01)
  G01M 15/00 (2006.01)
  G01L 5/13 (2006.01)
  G01P 5/24 (2006.01)
  G01F 1/66 (2006.01)

(52) U.S. Cl.
  CPC ........ G01P 5/245 (2013.01); *F05D 2220/323* (2013.01)

(58) Field of Classification Search
  CPC ... G01L 5/00; G01L 5/133; G01P 5/00; G01P 5/245; G01P 5/26; F02K 3/00; F02K 3/04; G01M 15/00; G01M 15/14
  See application file for complete search history.

(56) References Cited

U.S. PATENT DOCUMENTS

| | | | |
|---|---|---|---|
| 7,565,269 B2 * | 7/2009 | Parfitt | G01L 5/133 702/182 |
| 7,658,114 B1 | 2/2010 | Sui et al. | |
| 8,327,698 B2 * | 12/2012 | Sand | F02K 3/04 73/116.03 |
| 2013/0174669 A1 | 7/2013 | Sui et al. | |
| 2015/0098842 A1 | 4/2015 | Menian | |
| 2015/0377669 A1 | 12/2015 | DeSilva et al. | |

\* cited by examiner

SYSTEM AND METHOD OF NON-INTRUSIVE THRUST MEASUREMENT

CROSS REFERENCE

This application is a utility application of and claims priority to co-pending provisional application entitled "SYSTEM AND METHOD OF NON-INTRUSIVE THRUST MEASUREMENT", U.S. Application No. 62/348,684 filed on Jun. 10, 2016, the entirety of which is hereby incorporated by reference.

FIELD OF THE DISCLOSURE

The present disclosure relates generally to anemometry, and more specifically to measurement of flow velocity without the use of instrumentation in the mass flow.

BACKGROUND

In the field of fluid mechanics, engineers have long sought a velocity measurement technique that avoids the complications associated with intrusive probes. In the present application, an acoustic velocity measurement technique, based upon sonic anemometry, is presented which can be used for high subsonic Mach number measurements. Contrasting with existing acoustic techniques, this method has been developed for and demonstrated in flow Mach numbers above 0.3. To facilitate further discussion of this technique, and its improvements over current acoustic methods, an overview of the state of the art is first provided.

In practice, two fundamental acoustic techniques exist for non-intrusively measuring flow velocities. These two techniques are Acoustic Doppler Velocimetry ("ADV") and Sonic Anemometry ("SA"). The major difference between these two techniques is the domain in which they are analyzed. ADV, for example, uses the Doppler Shift Effect, which is analyzed in the frequency domain, to characterize flow velocity. To perform this measurement, an acoustic pulse with a known frequency is first emitted into the flow field. Particles, moving in the stream-wise direction, then reflect the acoustic signals back to a detector. The reflected signal, which now has a Doppler shifted frequency, is then compared with the initial frequency to determine the particle's velocity as given by equation (1) below.

$$V_p = \frac{c * f_d}{2 f_o} \quad (1)$$

Above, $V_p$ is the velocity of the particle, c is the speed of sound in the medium, $f_d$ is the Doppler shift frequency, and $f_o$ is the initial frequency.

SA, on the other hand, uses time of flight measurements in order to determine the flow's velocity using the time domain, with sensitivity to the flow velocity exhibited in the line integral equation for the time of flight of an acoustic wave.

$$t = \oint \frac{|d\bar{s}|}{c + \bar{V} \cdot d\bar{s}} \quad (TOF)$$

To perform an SA measurement, two acoustic path measurements are made between emitter and receiver pairs. The first measurement set follows a downstream acoustic propagation path ($\bar{V} \cdot d\bar{s} > 0$), and the second set follows the upstream propagation path ($\bar{V} \cdot d\bar{s} < 0$). Using the fact that the acoustic signal takes longer to propagate in the upstream direction due to the reduced denominator in equation (TOF), the medium's velocity can be determined "relatively independently of the flow properties (spatial and time variations, density, temperature, etc.)." By using precisely the same path but with opposite wave directions, the SA velocity equation is shown as equation (2) below.

$$V_d = \frac{L}{2}\left(\frac{1}{t_d} - \frac{1}{t_u}\right) \quad (2)$$

In equation (2), $V_d$ is the velocity of the medium in the direction parallel to the component distance vector, L is the distance between the transmitter and receiver (should be approximately the same for upstream and downstream measurements), $t_d$ is the downstream propagation time delay, and $t_u$ is the upstream propagation time delay.

While both SA and ADV measure velocity using acoustics, there are drawbacks of using ADV which make it unfeasible in a high noise environment. Perhaps the greatest among these is the need for entrained particles. These particles, if not readily available in the flow, must be introduced into the flow stream—impractical for in situ applications. The other significant drawback of using ADV is the relatively low signal-to-noise ratio (SNR) inherent in scattered acoustic signals. In order to measure velocities using ADV, an optimal SNR of 10 dB must be obtained. Other research has found that a 20 dB SNR assures reliable velocity measurement. This signal-to-noise ratio would be difficult to obtain in a noisy environment, typical of high subsonic Mach number jets, because SNR is a function of entrained particle diameter and concentration. For the given reasons, emphasis in this article will be placed on the time delay based velocity measurement approach instead.

The existing SA technique also poses several challenges that make immediate implementation in high subsonic Mach number jets difficult. Perhaps the most pertinent challenge is that this technique has only been proven for low Mach numbers. A survey of the literature reveals that reported applications are restricted to velocities less than 100 m/s, while reported uncertainties are widely varied. One study reports a typical sonic anemometer's velocity range is ±30 m/s with accuracies in the range of +0.02-0.05 m/s. Kaijo-Denki type DA310 devices, on the other hand, have been used to measure wind velocities up to 60 m/s with an accuracy of ±1% of the measurement values. In an experimental setting, Mylvaganam et al. performed an investigation in gaseous flows from 0 m/s to 100 m/s, but were only able to report velocity measurements up to 70 m/s with a 3% uncertainty reported across the measurement span. Assuming 20° C. ambient conditions, the 100 m/s limitation of the aforementioned SA device corresponds to a Mach number of 0.3.

This Mach number limitation is, in large part, a product of the upstream acoustic propagation requirement. Although this implementation results in optimized uncertainties by maximizing the velocity-dependent time delay difference [c.f. equation (2)], signal degradation due to propagation curvature and impedance grows with Mach number. This argument is supported by an investigation performed by Tack & Lambert (1965). The overall effect of this increased acoustic attenuation is a decrease in SNR which has a significant negative impact on time delay estimation accuracy. In order to successfully perform a non-invasive acoustic velocity measurement in a high subsonic Mach number, SNR must be maximized to ensure accurate time delay and, ultimately, velocity estimation.

The present application discloses one or more of the features recited in the appended claims and/or the following features which, alone or in any combination, may comprise patentable subject matter.

SUMMARY

According to an aspect of the present disclosure, in a gas turbine engine having a partially bounded exhaust plume a method of non-intrusively determining thrust in real time comprises transmitting a wave across the bounded exhaust plume; receiving the transmitted wave; determining a measurement parameter of the exhaust plume based on a characteristic of the received wave; comparing the measurement parameter to a reference parameter; and determining the thrust based on the comparison.

In some embodiments the measurement parameter is a function of the velocity of the exhaust plume. In some embodiments the measurement parameter is a function of the velocity and temperature of the exhaust plume. In some embodiments the reference parameter is a prior measurement parameter. In some embodiments the reference parameter is a predetermined parameter. In some embodiments the reference parameter is a function of inlet velocity and temperature.

In some embodiments the transmitted wave is a sound or a light. In some embodiments the characteristic is time of arrival, frequency, or refraction. In some embodiments the step of receiving the transmitted wave comprises receiving the wave at a plurality of receivers each axially displaced from one another.

According to another aspect of the present disclosure, a non-intrusive thrust measurement system comprises a boundary defining a passage along an axis adapted to contain a fluid flowing from upstream to downstream; a transmitter at the boundary; a receiver suite at the boundary and adapted to receive a transmission from the transmitter; and a processor in communication with the transmitter and receiver suite adapted to determine a parameter from a characteristic of the transmission at the receiver suite and adapted to determine a thrust parameter from the parameter.

In some embodiments the thrust parameter is a function of velocity. In some embodiments the transmitter is a laser or is acoustic. In some embodiments the receiver suite comprises a first acoustic receiver at the boundary and adapted to receive a transmission from the acoustic transmitter; a second acoustic receiver at the boundary and adapted to receive the transmission from the at least one acoustic transmitter; wherein the characteristic determined by the processor is the time of arrival of the transmission at the first receiver and second receiver; wherein the first and second acoustic receivers and the acoustic transmitter define a plane substantially parallel to the axis and wherein the second acoustic receiver is downstream from the first acoustic receiver and the first acoustic receiver is downstream from the acoustic transmitter.

In some embodiments the acoustic transmitter operates at 40 khz and above. In some embodiments the processor is further adapted to compare the parameter to a baseline in determining the thrust parameter. In some embodiments the passage is a bypass flow.

BRIEF DESCRIPTION OF THE DRAWINGS

The following will be apparent from elements of the figures, which are provided for illustrative purposes and are not necessarily to scale.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

For the purposes of promoting an understanding of the principles of the disclosure, reference will now be made to a number of illustrative embodiments in the drawings and specific language will be used to describe the same.

The present disclosure is directed to systems and methods of non-intrusive anemometry and thrust measurement that overcome the deficiencies in the prior art noted above. More specifically, the present disclosure is directed to a systems and methods for anemometry and thrust measurement that are feasible in a high noise environment, do not rely on entrained particles, avoid a relatively low signal-to-noise ratio, and may be implemented in high subsonic Mach number jets.

Figure 8:
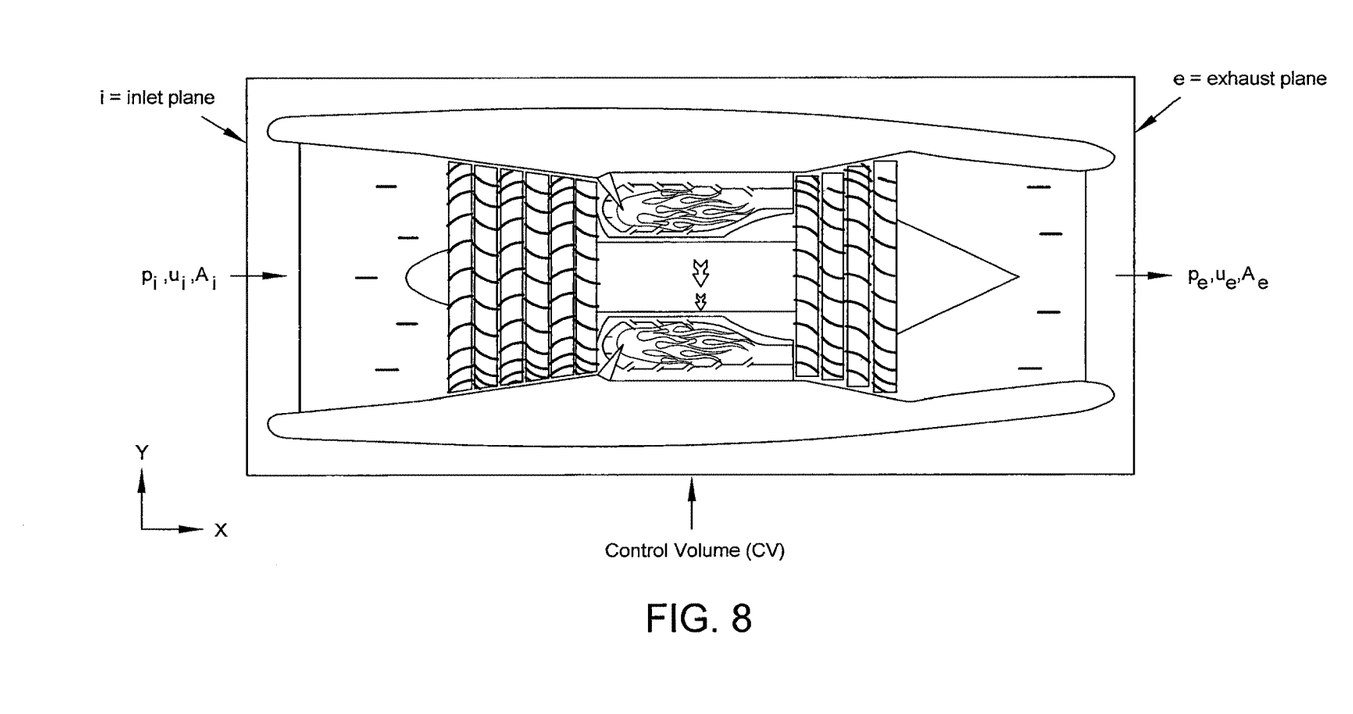
FIG. 8 is a schematic diagram of the control volume of a gas turbine engine as used for non-intrusive anemometry.

FIG. 8 is a schematic diagram of the control volume CV of a gas turbine engine as used for non-intrusive anemometry. The control volume CV extends between an inlet plane i and exhaust plane e. Airflow entering the control volume CV at the inlet plane i may have characteristics such as inlet density $\rho_i$, inlet velocity $u_i$, and inlet area $A_i$. Airflow exiting the control volume CV at the exit plane e may have characteristics such as exit density $\rho_e$, exit velocity $u_e$, and exit area $A_e$.

As developed in equations (A) through (G) below, in subsonic jets the thrust of an engine is a function of flow velocity (v), temperature (T), and their spatial distribution at the inlet and exhaust plane.

$$\sum F_x = \int_V \left[ \frac{\partial (\rho v)}{\partial t} \right] dV + \int_A v(\rho \vec{v}) \cdot \vec{n} dA \quad (A)$$

$$\sum F_x = \int_S v(\rho \vec{v}) \cdot \vec{n} dA = \left[ \int_A \rho v^2 dA \right]_e - \left[ \int_A \rho v^2 dA \right]_i \quad (B)$$

$$\sum F_x = \left[ \int_A \frac{P}{RT} v^2 dA \right]_e - \left[ \int_A \frac{P}{RT} v^2 dA \right]_i \quad (C)$$

In subsonic jets the pressure is approximately equal to atmospheric pressure, and it can be assumed that ideal gas constant (R) is approximately equal to the ideal gas constant of air ($R_{air}$) since the mass flow rate of the air is much greater than the mass flow rate of fuel. Therefore:

$$\sum F_x = \frac{P_{atm}}{R_{air}} \left[ \int_A \frac{v^2}{T} dA \right]_e - \left[ \int_A \frac{v^2}{T} dA \right]_i \quad (D)$$

$$\dot{m}_i = \frac{P_{atm}}{R_{air}} \left[ \int_A \frac{v}{T} dA \right]_i \quad (E)$$

$$\dot{m}_e = \frac{P_{atm}}{R_{air}} \left[ \int_A \frac{v}{T} dA \right]_e \quad (F)$$

$$\dot{m}_f = \dot{m}_e - \dot{m}_i \quad (G)$$

Figure 1:
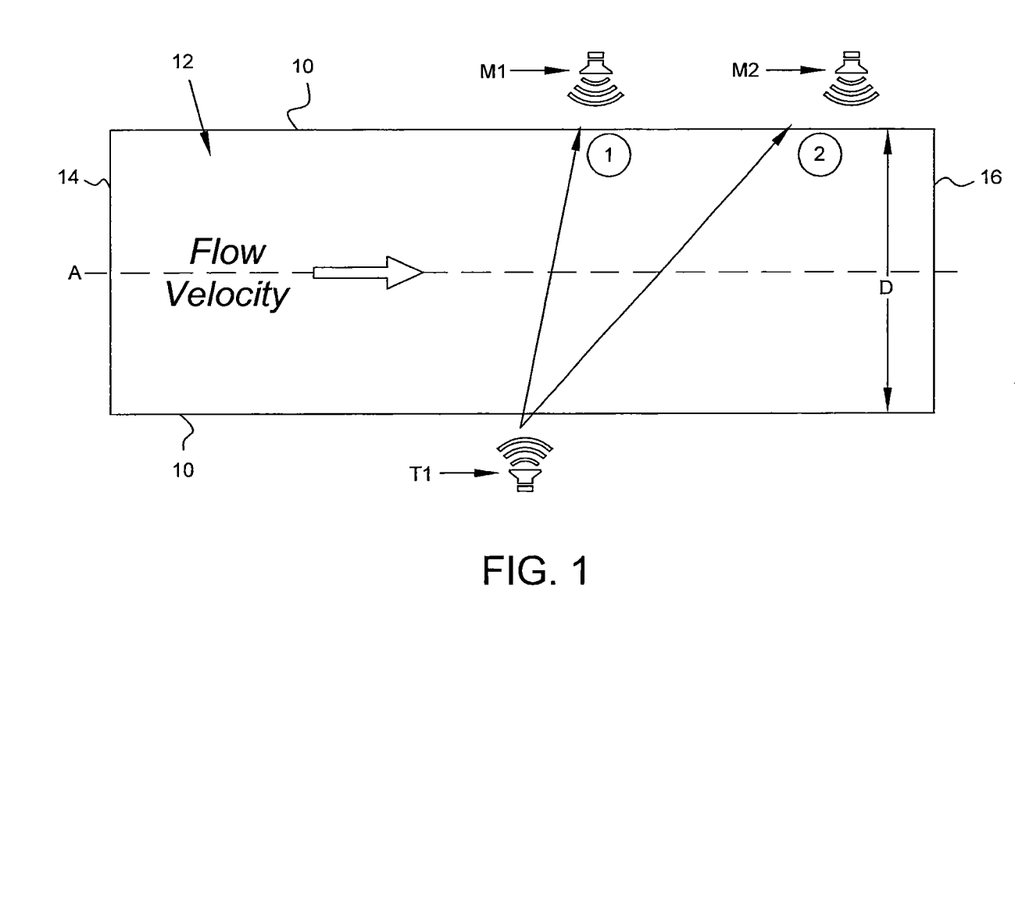
FIG. 1 is a schematic diagram illustrating the arrangement of acoustic components in an non-intrusive anemometer in accordance with some embodiments of the present disclosure.

The disclosed subject matter addresses acoustic measurement of flow velocity in a high subsonic Mach number jet with high signal-to-noise ratios which are imperative for overcoming background noise associated with high speed flow. In order to circumvent the existing SNR limitations associated with upstream acoustic propagation, a non-intrusive sonic anemometry technique is described. FIG. 1 depicts the new arrangement of acoustic components for the disclosed technique.

FIG. 1 illustrates a boundary 10 that defines a passage 12 adapted to contain a fluid flowing from an upstream side 14 to a downstream side 16. Boundary 10 may be annular, defining a cylindrical passage 12. Boundary 10 may therefore have a diameter D and a central axis A. In engine applications, the central axis A may align with the axis of the engine. However, boundary 10 may additionally have a rectangular or polygonal cross-section.

Fluid flowing in the passage 12 may be an exhaust plume from a turbine engine, or may be the engine bypass flow. The fluid may comprise air, entrained fuel, and/or particulates.

As shown in the embodiment of FIG. 1, one sound source and two receiving microphones are used. In some embodiments, the sound source (transmitter T1) may be located on one side of the flow field (passage 12) and may be positioned at or proximate boundary 10. Transmitter T1 may be adapted to transmit an acoustic wave at 40 kHz or higher. In some embodiments the transmitter T1 is either piezoelectric or pneumatic.

Two acoustic receivers (microphones M1 and M2) may be located opposite the sound source T1, displaced from each other in the stream-wise direction (i.e. displaced along the axis of mass flow). Microphones M1 and M2 may be positioned at or proximate the boundary 10.

In some embodiments microphones M1 and M2 define a plane substantially parallel to the axis A. Microphone M2 may be positioned downstream from microphone M1, and microphone M1 may in turn be positioned downstream from sound source T1. The axial distance between microphone M1 and microphone M2 may be less than the diameter D of boundary 10. In some embodiments The axial distance between microphone M1 and microphone M2 may be greater than the diameter D of boundary 10 but less than two times the diameter D.

Microphones M1 and M2 may be coupled to a processor (not shown). The processor may be adapted to determine the time of arrival of a transmission at the first microphone M1 and adapted to determine the time of arrival of a transmission at the second microphone M2. Microphones M1 and M2 may further be coupled to a correlator, which may be integral to the processor. The correlator may be adapted to determine order and/or timing of receipt of a transmission at microphones M1 and M2.

In some embodiments additional pairs of microphones like M1 and M2 may be positioned at or proximate the boundary 10. Microphone pairs may be spaced about the circumference of boundary 10 and may be axially aligned or may be axially unaligned. In some embodiments a plurality of microphones and/or microphone pairs form a receiver suite or a receiver set.

In some embodiment non-acoustic receivers are positioned in place of microphones M1 and M2 in FIG. 1. Non-acoustic receivers may be positioned in receiver pairs, in axially-offset receiver pairs, or as a plurality of receivers in a receiver suite.

In some embodiments the receivers are coupled to a processor. The processor may be adapted to determine the time of arrival of the transmission at a first receiver and at a second receiver.

The processor may be adapted to determine a parameter from a characteristic of the transmission at the receiver suite and adapted to determine a thrust parameter from the parameter. The thrust parameter may be a function of velocity. The processor may be further adapted to compare the parameter to a baseline when determining the thrust parameter.

Transmitter T1 may be a non-acoustic type transmitter, such as a laser,

In the development described to follow, the flow is assumed to be uniform. This assumption is often violated in practice since it is not normally practical to place the microphones into the flow due to hydrodynamic pressure fluctuations that normally result from the flow. Therefore, the measurement typically includes propagation through a shear layer, and the resulting velocity measured is often referred as the 'virtual velocity'. For many applications, this virtual velocity remains useful for bulk flow field sensing such as overall flow rate.

To determine the flow velocity, simultaneous time delay measurements may be collected in conjunction with the vertical and horizontal displacements between acoustic components. Separating each acoustic path into vertical and horizontal propagation vectors, the flow velocity may be cast as a function of time delays and distances:

$$v_x = \frac{\left[ \left(\frac{D_{x2}}{\tau_2}\right)^2 + \left(\frac{D_{y2}}{\tau_2}\right)^2 - \left(\frac{D_{x1}}{\tau_1}\right)^2 - \left(\frac{D_{y1}}{\tau_1}\right)^2 \right]}{\left( \frac{2 D_{x2}}{\tau_2} - \frac{2 D_{x1}}{\tau_1} \right)} \quad (3)$$

Where $v_x$ is the virtual flow velocity in the stream-wise direction, $D_{xn}$ represents the stream-wise displacement between the transmitter and the $n^{th}$ microphone, $D_{yn}$ represents the radial displacement between the transmitter and the $n^{th}$ microphone, and $t_n$ is the acoustic propagation time delay between the transmitter and the $n^{th}$ microphone.

As shown in equation (3), the effects of flow properties are absent in this new velocity formulation as well. It is important to note that in order to successfully perform this velocity measurement, several important conditions must be satisfied. The first condition is that the true speed of sound through the medium (absent the medium's velocity effects) be approximately the same along each acoustic path. The second condition is that the velocity in the vertical direction be negligible when compared to the horizontal flow velocity, or the vertical velocity is known.

Using a novel kinematic manipulation, velocity can be determined using two downstream measurements. Like the existing technique, the measurement of velocity becomes a function of time delays and distances, but the SNR of the measurement is significantly improved by removing the Upstream measurement requirement.

FIG. 1 portrays the equipment associated with the novel acoustic velocity measurement technique. In order to conduct the novel acoustic time-delay velocimetry measurement, three major pieces of equipment may be used in some embodiments. A transmitter T1, which may be placed on one side of the flow, and two microphones M1 and M2, which may be placed on the other side of the flow. The two microphones may be located on the same horizontal axis and may be displaced in the streamwise direction. An acoustic pulse is emitted from the transmitter and the signal is picked up at the two microphone locations. Using the measured acoustic propagation time delay for each of the two acoustic paths, as well as the distances between the equipment, it is possible to determine the average flow velocity of the medium.

Figure 2:
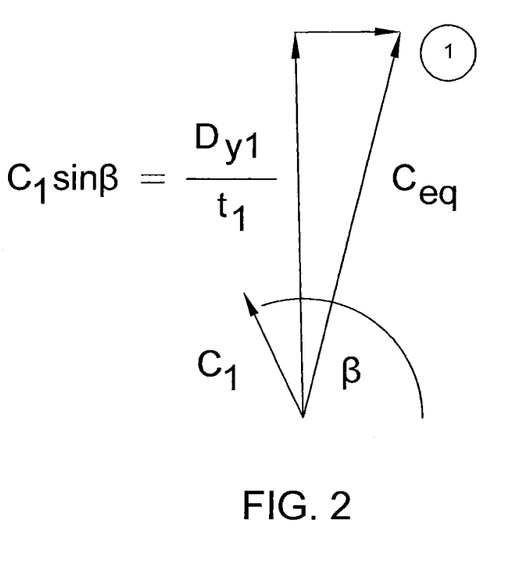
FIG. 2 is a schematic diagram illustrating a first acoustic path in an non-intrusive anemometer in accordance with some embodiments of the present disclosure.

Consider the first acoustic path, which is illustrated in FIG. 2 and described in equation (3A) below:

$$C_1 \cos\beta + \overline{V}_x = \frac{D_{x1}}{t_1} \quad \text{(3A)}$$

FIG. 2 portrays the variables associated with the first acoustic path propagation measurement. The equivalent speed of sound $C_{eq}$ can be described as a combination of the medium's average velocity, $\overline{V}_x$, and the average speed of sound along the acoustic path $C_1$. Furthermore, this relationship can be described in terms of vector components as shown in equations (B1) and (B2) below.

$$C_1 * \cos(\beta) + \overline{V}_x = \frac{D_{x1}}{t_1} \quad \text{(B1)}$$

$$C_1 * \sin(\beta) = \frac{D_{y1}}{t_1} \quad \text{(B2)}$$

Using the components of the equivalent speed of sound above, the velocity measurement's dependency on angle of propagation can be discarded by using the trigonometric relationship as shown below.

$$1 = \cos^2\beta + \sin^2\beta \quad \text{(B3)}$$

$$\cos(\beta) = \frac{\left(\frac{D_{x1}}{t_1} - \overline{V}_x\right)}{C_1} \quad \text{(B4)}$$

$$\sin(\beta) = \frac{\left(\frac{D_{y1}}{t_1}\right)}{C_1} \quad \text{(B5)}$$

$$1 = \left(\frac{\left(\frac{D_{x1}}{t_1} - \overline{V}_x\right)}{C_1}\right)^2 + \left(\frac{\left(\frac{D_{y1}}{t_1}\right)}{C_1}\right)^2 \quad \text{(B6)}$$

$$C_1^2 = \left(\frac{D_{x1}}{t_1} - \overline{V}_x\right)^2 + \left(\frac{D_{y1}}{t_1}\right)^2 \quad \text{(B7)}$$

Figure 3:
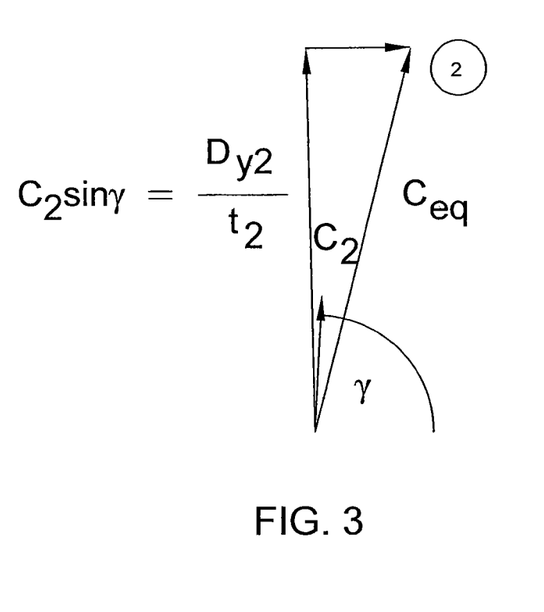
FIG. 3 is a schematic diagram illustrating a second acoustic path in an non-intrusive anemometer in accordance with some embodiments of the present disclosure.

Next, consider the second acoustic path which is illustrated in FIG. 3 and described in equation (3B) below:

$$C_2 \cos\gamma + \overline{V}_x = \frac{D_{x2}}{t_2} \quad \text{(3B)}$$

FIG. 3 portrays the variables associated with the second acoustic path propagation measurement. The equivalent speed of sound $C_{eq}$ can once again be described as a combination of the medium's average velocity, $\overline{V}_x$, and the average speed of sound along the acoustic path $C_2$. Using the same manipulation described for path one, we can discard the velocity measurement's dependency on angle of propagation as shown below.

$$C_2 * \cos(\gamma) + \overline{V}_x = \frac{D_{x2}}{t_2} \quad \text{(B8)}$$

$$C_2 * \sin(\gamma) = \frac{D_{y2}}{t_2} \quad \text{(B9)}$$

$$1 = \cos^2\gamma + \sin^2\gamma \quad \text{(B10)}$$

$$\cos(\gamma) = \frac{\left(\frac{D_{x2}}{t_2} - \overline{V}_x\right)}{C_2} \quad \text{(B11)}$$

$$\sin(\gamma) = \frac{\left(\frac{D_{y2}}{t_2}\right)}{C_2} \quad \text{(B12)}$$

$$1 = \left(\frac{\left(\frac{D_{x2}}{t_2} - \overline{V}_x\right)}{C_2}\right)^2 + \left(\frac{\left(\frac{D_{y2}}{t_2}\right)}{C_2}\right)^2 \quad \text{(B13)}$$

$$C_2^2 = \left(\frac{D_{x2}}{t_2} - \overline{V}_x\right)^2 + \left(\frac{D_{y2}}{t_2}\right)^2 \quad \text{(B14)}$$

Finally, the assumption is made that $C_1 \cong C_2$. Using this assumption, equation (B7) and equation (B14) can be combined to determine velocity as shown below.

$$\left(\frac{D_{x1}}{t_1} - \overline{V}_x\right)^2 + \left(\frac{D_{y1}}{t_1}\right)^2 = \left(\frac{D_{x2}}{t_2} - \overline{V}_x\right)^2 + \left(\frac{D_{y2}}{t_2}\right)^2 \quad \text{(B15)}$$

$$\left(\frac{D_{x1}}{t_1}\right)^2 - \frac{2\overline{V}_x D_{x1}}{t_1} + \overline{V}_x^2 + \left(\frac{D_{y1}}{t_1}\right)^2 = \quad \text{(B16)}$$

$$\left(\frac{D_{x2}}{t_2}\right)^2 - \frac{2\overline{V}_x D_{x2}}{t_2} + \overline{V}_x^2 + \left(\frac{D_{y2}}{t_2}\right)^2$$

$$\left(\frac{D_{x1}}{t_1}\right)^2 - \frac{2\overline{V}_x D_{x1}}{t_1} + \left(\frac{D_{y1}}{t_1}\right)^2 = \left(\frac{D_{x2}}{t_2}\right)^2 - \frac{2\overline{V}_x D_{x2}}{t_2} + \left(\frac{D_{y2}}{t_2}\right)^2 \quad \text{(B17)}$$

$$\frac{2\overline{V}_x D_{x2}}{t_2} - \frac{2\overline{V}_x D_{x1}}{t_1} = \left(\frac{D_{x2}}{t_2}\right)^2 + \left(\frac{D_{y2}}{t_2}\right)^2 - \left(\frac{D_{x1}}{t_1}\right)^2 - \left(\frac{D_{y1}}{t_1}\right)^2 \quad \text{(B18)}$$

$$\overline{V}_x \left(\frac{2D_{x2}}{t_2} - \frac{2D_{x1}}{t_1}\right) = \left(\frac{D_{x2}}{t_2}\right)^2 + \left(\frac{D_{y2}}{t_2}\right)^2 - \left(\frac{D_{x1}}{t_1}\right)^2 - \left(\frac{D_{y1}}{t_1}\right)^2 \quad \text{(B19)}$$

$$\overline{V}_x = \frac{\left(\left(\frac{D_{x2}}{t_2}\right)^2 + \left(\frac{D_{y2}}{t_2}\right)^2 - \left(\frac{D_{x1}}{t_1}\right)^2 - \left(\frac{D_{y1}}{t_1}\right)^2\right)}{\left(\frac{2D_{x2}}{t_2} - \frac{2D_{x1}}{t_1}\right)} \quad \text{(B20)}$$

As seen from equation (B20) above, the novel acoustic technique enables the determination of average flow velocity using two acoustic paths without requiring the use of an upstream measurement.

Overall, the primary benefit of using this method over prior-art Sonic Anemometry techniques lies in the arrangement of the acoustic components. By removing the requirement for an upstream propagation measurement, the measured acoustic signal's sound pressure level is improved, enabling higher SNR measurements. This added benefit will prove instrumental when the technique is implemented in a high noise environment.

Figure 4:
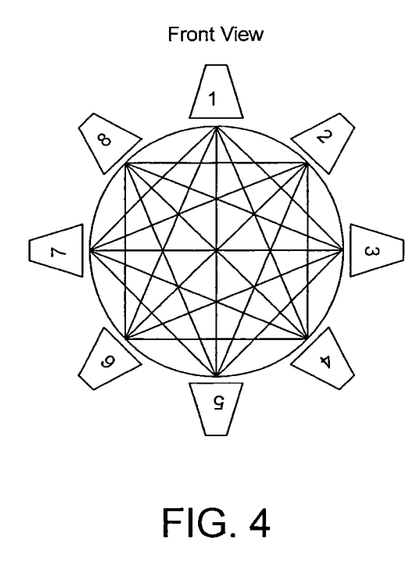
FIG. 4 is a schematic diagram illustrating the arrangement of acoustic components in an non-intrusive anemometer in accordance with some embodiments of the present disclosure.
Figure 5:
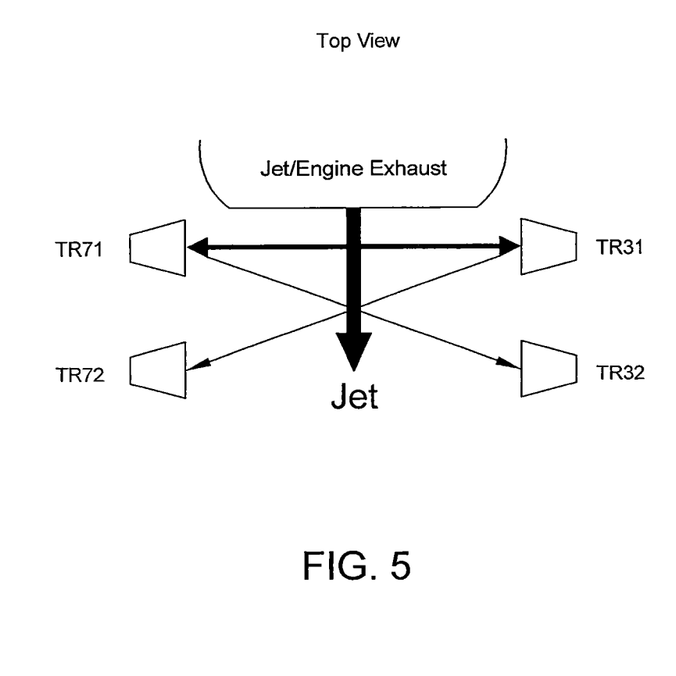
FIG. 5 is a schematic diagram illustrating the arrangement of acoustic components in an non-intrusive anemometer in accordance with some embodiments of the present disclosure.

Another embodiment is shown in FIG. 4, in which a series of transcievers (acoustic transmitters and receivers) are positioned around an exhaust plume. In this manner a three dimensional velocity contour of the exhaust plume may be determined from the respective velocities Vij across each path Sij, where i is the transmitter and j is the receiver.

In some embodiments, mass flow may be through a cylindrical passage having a diameter D and axis A oriented along the direction of mass flow. Transmitter T1 disposed across the mass flow from microphones M1 and M2, and these acoustic components may be disposed such that they are axially spaced by a distance of between ¼ D and 2 D from the transmitter. In some embodiments, transmitter T1 may be upstream of microphone M1 by a distance of between ¼ D and 2 D. In some embodiments microphone M1 may be upstream of microphone M2 by a distance of between ¼ D and 2 D. In still further embodiments, transmitter T1 may be upstream of microphone M2 by a distance of between ¼ D and 2 D. The selection of distance may be a function of the homogeneity of the medium and space limitations. While greater distances may provide more accurate results, the homogeneity of the flow and the physical requirements (weight, drag, cost) of containing the flow over the distances weigh heavily against excessive spacing.

Signal Processing

As with other implementations of sonic anemometry, the accurate determination of time delays between measured signals is a crucial performance requirement. Since signals in real environments are often polluted by acoustic noise, the accuracy of this determination can vary. In high noise applications, such as encountered for flows with Mach numbers approaching 1, determination of the true acoustic time delays will require a robust and proven signal processing technique.

An embodiment of the present disclosure uses an amplitude modulated sinusoid output in a burst with duration of two modulation periods.

$$s(t) = \begin{cases} \sin(2\pi f_m t)\sin(2\pi f_c t), & |t| \le 2/f_c \\ 0, & |t| > 2/f_c \end{cases} \quad \text{(C1)}$$

Due to the desire to operate in a part of the acoustic spectrum with minimal flow noise interference, the carrier signal frequency was chosen with $f_c$=40 kHz, a commonly available ultrasonic source frequency. The modulation frequency, $f_m$, was chosen to be one tenth, $f_c$, or 4 kHz modulation, resulting in an emitted burst duration of 0.5 milliseconds.

The short burst allows for more distinct acoustic signatures to be transmitted during the measurement duration. The increase in number of acoustic events ultimately reduces the uncertainty of the mean time delay estimation. However, due to the relatively large distance between transmitter and microphone for practical applications, the signal time-of-flight exceeded a single 40 kHz wave period, negating the use of a continuous signal. The amplitude modulation, on the other hand, helped to reduce this source of error associated with high frequency signals. When amplitude modulation was not used, time delay estimations exhibited 2π ambiguities that appeared as errors in increments of 1/(40 kHz) seconds (one carrier signal period). By implementing these two techniques, the signals may be better optimized for time delay estimation for the signal processor.

In some embodiments, sound pulses or chirps may be used to assist in identifying the signal to the receiver. As a receiver receives a wide spectrum of noise, the receiver must match a received signal such as a sound pulse or chirp against the profile of a sound pulse or chirp the receiver expected to receive.

Cross Correlation

A cross-correlation approach for acoustic event time determination was used to estimate time delays between the transmitter and microphone signals. Before performing this procedure on the signals, each measurement set was pre-conditioned to improve the accuracy of the estimator. This pre-conditioning was performed by setting to zero any signal regions known not to have originated from the sound source. A range of conceivable time delays were determined using maximum and minimum flow velocities and temperatures and used to isolate signal-containing portions of the time series. This technique minimized the influence of flow noise on the cross correlation algorithm.

After conditioning the measurement data to remove flow noise, cross correlation of the entire one second signal was performed. It is important to note that the full signal was cross-correlated rather than binning each individual acoustic burst. While binning the bursts would provide a greater number of time-resolved measurement samples, single-shot measurements were not desired and additional signal validation would be required to implement such temporally-resolved measurements in the presence of background noise. Monte Carlo simulations to be presented support these conclusions for the present methodology and application.

In the first approach, referred to as "Full Correlation," the full one second transmitter signal was cross-correlated with the entire one second microphone signal. After the time delay estimate was obtained, the process was repeated for the remaining 99 signal pairs. Using 100 time delay samples, the standard deviation of the samples was determined and specified for the set SNR value.

In the second approach, referred to as "Binned Correlation," the one second signal pairs were first divided into 30 different bins, each containing an acoustic burst measurement. Each transmitter bin was then cross correlated with its corresponding microphone bin to find 30 time delay estimates for the one second transmitter and microphone signal. The 30 time delays from binned signals were averaged, and one time delay estimate was found for a one second signal pair. The process was repeated for the remaining 99 signal pairs, and the standard deviation was determined for the set SNR value.

While binning and full signal cross correlation provided similar results above an SNR of −5 dB, high noise (SNR<−5 dB) causes errors in some of the binned time delay estimates, resulting in a less accurate overall time delay estimation. It is evident that the full signal cross-correlation approach is more practical in a high noise environment due to its lower standard deviation, and logarithmic error behavior at low SNR. By reducing the variability of the signal, time delay estimation uncertainty is reduced, which ultimately provides for a more accurate mean velocity measurement. The velocity measurement results, obtained using the full correlation approach, are discussed in the following section.

Aspects of the Disclosed Subject Matter

To generate the acoustic tone, an ultrasonic American Piezo 40 kHz transmitter may be used, which is capable of transmitting sound pressure levels up to 117 dB (measured 30 cm from source) with a driving voltage of 10 Vrms. At the 40 kHz carrier frequency, the signal is much easier to detect due to the relatively reduced flow noise present at high frequencies. The signal may also be produced in other manners, such as a Hartmann generator utilizing bleed air, electrical arcs, or other known acoustic producing methods.

Corrections

Velocity measurements were obtained by using equation (3), while accounting for the propagation distance through the relatively quiescent air around the jet. Combining the known distances and the measured time delays, average flow velocities were then determined across the 10.16 cm distance using equation (3). Assuming the measured velocity was due solely to the 5.08 cm diameter jet, the time delay measurements were corrected by subtracting the time-of-flight through the quiescent air at a known temperature:

$$t_{1corrected} = t_{1measured} - \frac{D_{T1-M1} - D_{jet}}{c_a} \quad (4)$$

Results and Discussion

The new form of sonic anemometry currently developed was applied for measurements near the nozzle exit of a high speed jet at varying set Mach numbers.

Figure 6:
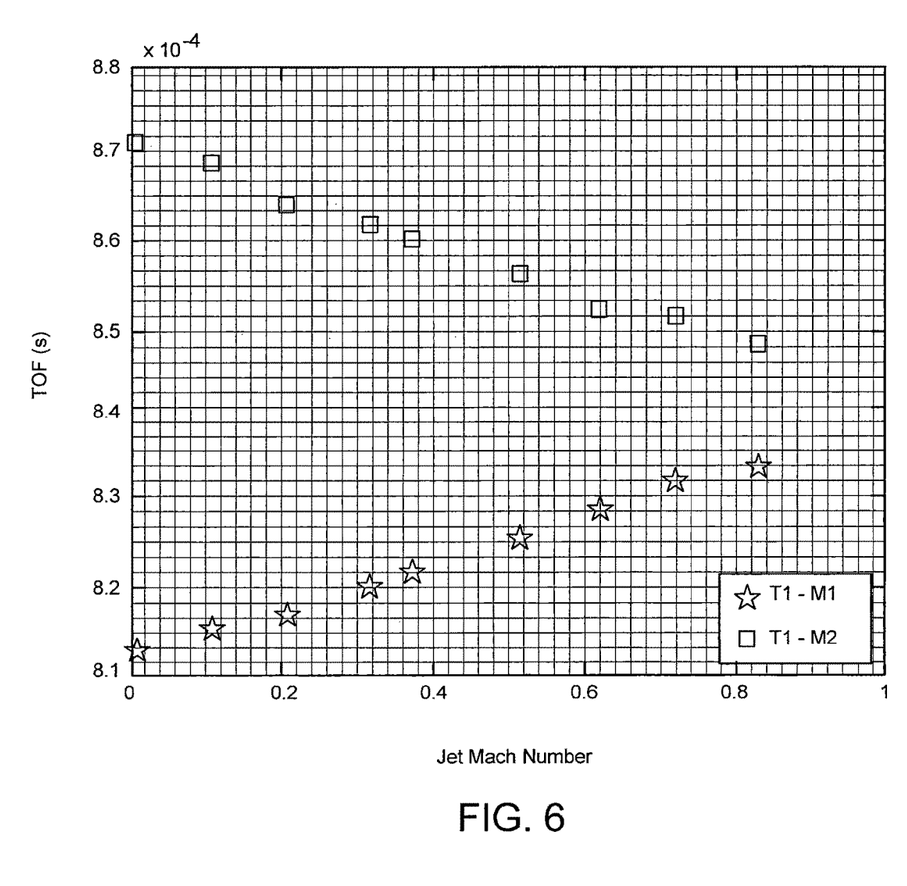
FIG. 6 is a graph of experimental results obtained using the disclosed systems and methods.

The raw results obtained by the instrument—acoustic wave time of flight—exhibit the sensitivity of the technique with Mach number (FIG. 6). As expected, the time delay between the transmitter and microphone M1 increases as the jet Mach number rises due to the refractive effects induced by the flow Mach number. Conversely, the time delay between the transmitter and microphone M2 decreases with increasing Mach number because the flow "carries" the acoustic wave towards microphone 2. The downstream motion of the medium results in a larger effective speed of sound, which ultimately reduces the acoustic time of flight detailed in equation (TOF).

The jet velocities were determined by evaluating equations (3) and (4) for the measured time delay values and the relative distances between the acoustic components. The Modified Sonic Anemometry (MSA) measurements were validated using the jet isentropic Mach number based upon the measured nozzle pressure ratio, and the facility total temperature was used to obtain sound speed and, thus, jet velocity.

Using the distance measurement uncertainties, as well as the Monte Carlo results discussed above, the velocity measurement uncertainty was quantified using the propagation of errors formulation:

$$u_{\overline{V_x}} = \sqrt{\left(\frac{\partial V_x}{\partial t_1}u_{t1}\right)^2 + \left(\frac{\partial V_x}{\partial t_2}u_{t2}\right)^2 + \left(\frac{\partial V_x}{\partial D_x}u_{D_x}\right)^2 + \left(\frac{\partial V_x}{\partial D_y}u_{D_y}\right)^2} \quad (5)$$

In equation (5), the partial derivative terms were determined using equation (3), and the u terms represent the uncertainty in the subscripted term's measurement. The subscripts $D_x$ and $D_y$, in equation (5), refers to the streamwise and transverse (radial) displacement between microphones.

The key validation results of the study are provided in FIG. 6. The plenum conditions were used to obtain velocity values for isentropic expansion to atmospheric pressure as the standard of comparison. The velocity uncertainties obtained using equation (5) are reported as error bars. For all Mach numbers measured, the expected velocities fell within the predicted error range. Additional analysis of the velocity errors exhibited in FIG. 6 is described to follow.

A basic dimensional analysis informed by standard low speed SA techniques yields that velocity uncertainty is simply $$u_{\overline{V_x}} = \frac{c^2}{2L}\delta t \quad (6)$$

In equation (6), c is the speed of sound, L is the distance between microphone and source, and $$u_{\overline{V_x}}$$

is the uncertainty in velocity, and δt is the uncertainty in time delay estimation. While the above relationship is based on the assumption that $V_x^2 \ll c^2$, velocity uncertainty in the modified approach is expected to scale with distance and equivalent speed of sound, as well. After some manipulation, namely, replacing δt with the equivalent relationship in terms of carrier signal phase, $$\frac{\delta \varphi}{2\pi f_o},$$

uncertainty relationship becomes:

$$\delta V_x = \frac{C^2}{4\pi f_o L} \delta\varphi \quad (7)$$

In equation (7), $f_o$ is the carrier frequency, and $\delta\varphi$ is the phase angle uncertainty. For a given SNR and number of signal periods measured, it is expected that $\delta\varphi$ is relatively universal, such that the term $$\frac{C^2}{4\pi f_o L}$$

should scale the velocity uncertainty. The evaluation of this term for the carrier frequency (40 kHz), L and room temperature sound speed was 0.82 m/s. This relationship enables instrumentation scaling and parametric studies of performance parameters, such as changing $f_o$. For instance, in the latter example, a doubling of $f_o$ is seen to halve the scaled velocity uncertainty. The same can be said for scaled increases of the propagation length L. Finally, it is interesting to note that since the sound speed is proportional to $\sqrt{T}$, the velocity uncertainty scales directly as the flow static temperature.

Figure 7:
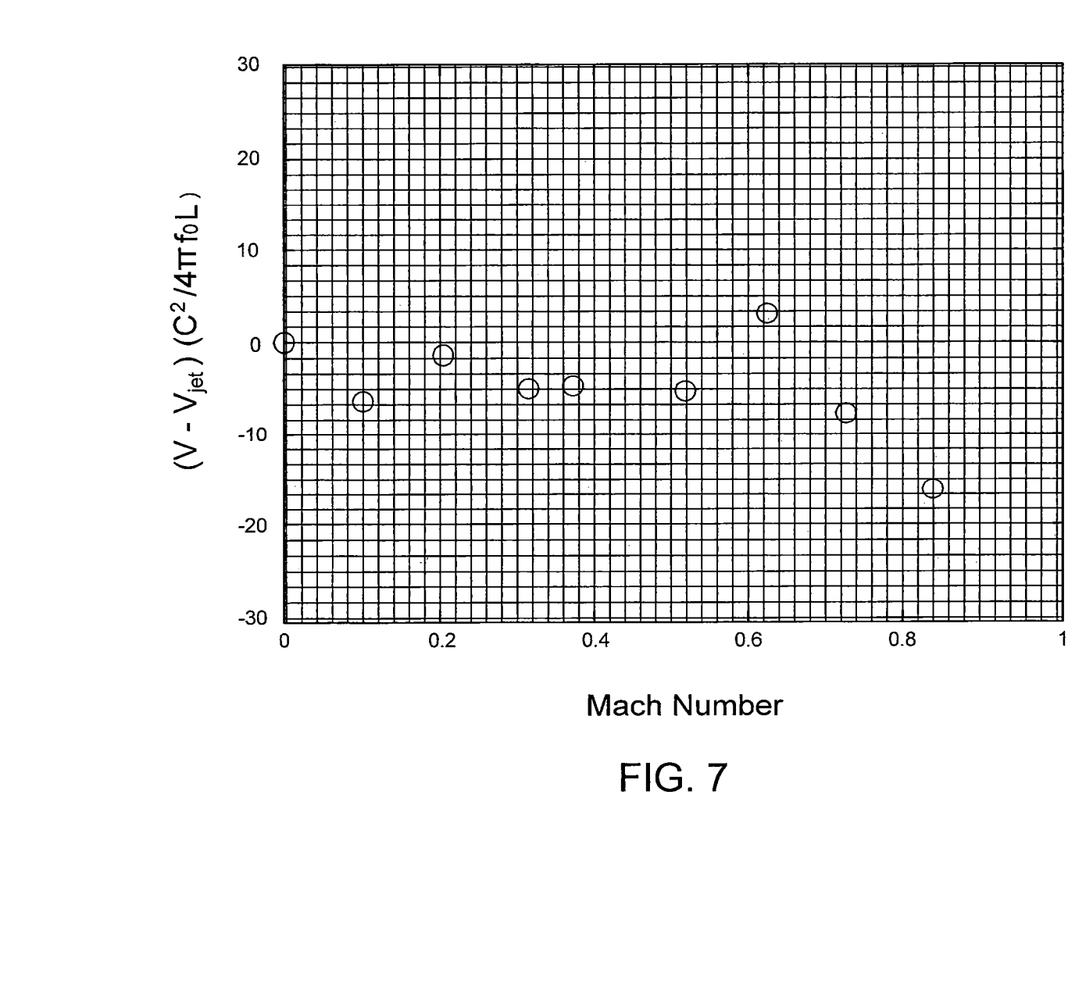
FIG. 7 is a graph of experimental results obtained using the disclosed systems and methods.

The errors between MSA measured velocity and the facility indicated velocity were scaled using the results from equation (7) and plotted in FIG. 7. Typical values were on the order of unity, although some extreme cases were greater. The root mean square error between measured and expected values was 4 m/s, or $$4.9 \frac{C^2}{4\pi f_o L}.$$

It is clear from the results of FIG. 7 that, just as indicated by the SA uncertainty formulation, the error exhibits no clear trend with velocity.

The systems and methods disclosed herein for measuring mass flow velocity have wide ranging applications. As discussed above, these systems and methods can be used to measure flow velocity exiting an aircraft engine during operation. Similarly, the systems and methods could be applied, using a towed array system, to measure flow velocity from the propeller of a ship.

Figure 9:
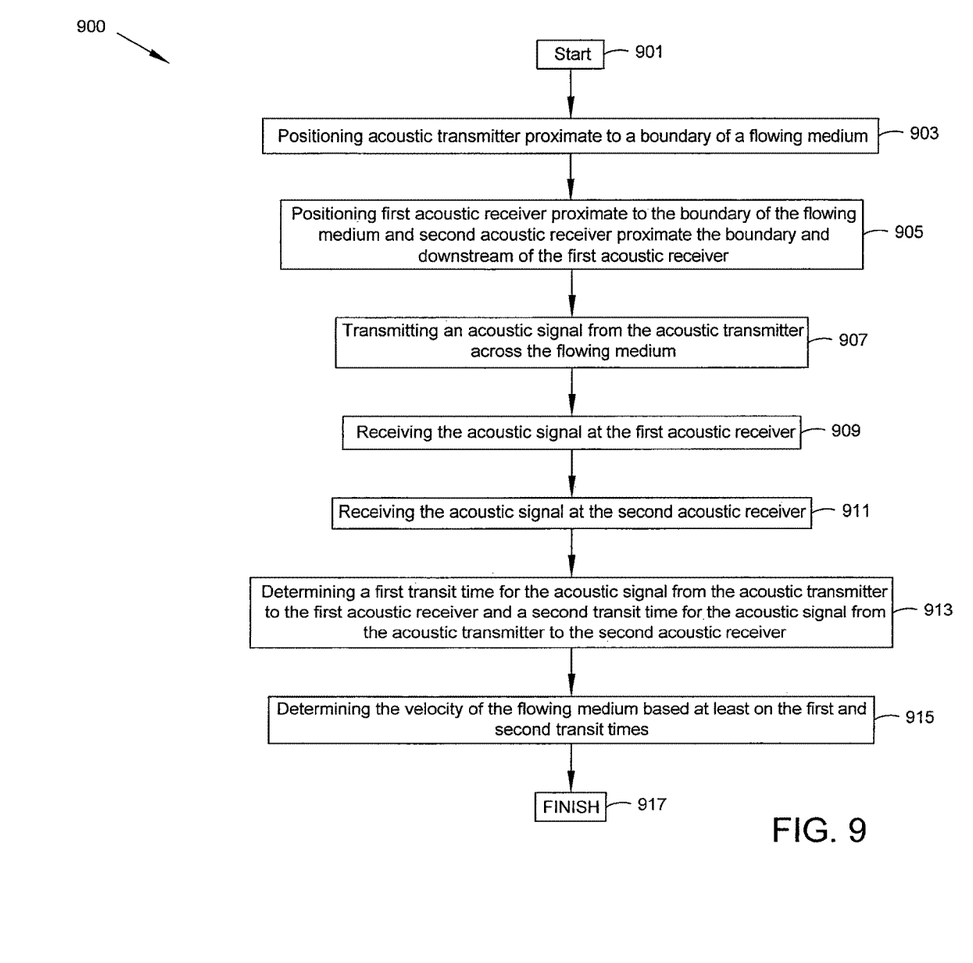
FIG. 9 is a flow diagram of a method in accordance with some embodiments of the present disclosure.

The present disclosure thus provides a method 900 of non-intrusive anemometry as shown at FIG. 9. Method 900 begins at block 901. At block 903 at least one acoustic transmitter T1 is positioned at or proximate the boundary of a flow passage containing a flowing medium. The flow medium may be air, or air mixed with exhaust gases, or exhaust gases with entrained particulate. The flowing medium may be flowing at greater than 0.3 Mach. The flowing medium may be the bypass fan exhaust of a turbine engine.

At 905, at least two acoustic receivers are positioned at or proximate the boundary. A first acoustic receiver may be positioned downstream from the acoustic transmitter, and a second acoustic receiver may be positioned downstream from the first acoustic receiver. The acoustic receivers may be positioned across the flow passage from the acoustic transmitter.

At block 907 the acoustic transmitter transmits an acoustic signal across the flowing medium in the flow passage. The acoustic signal may be an amplitude modulated sinusoid and/or a chirp. The acoustic signal may have a frequency of 40 kHz or greater. In some embodiments the step of transmitting an acoustic signal at block 907 may further comprise bleeding air from a compressor for generation of the acoustic signal.

The acoustic signal is received at the first acoustic receiver at block 909 and at the second acoustic receiver at block 911. At block 913 a first transit time between the acoustic transmitter and the first acoustic receiver is determined, and a second transit time between the acoustic transmitter and the second acoustic receiver is determined. Based on the first and second transit times a velocity of the flowing medium is determined at block 915. The determining steps at 913 and 915 may be performed by a processor coupled to each of the acoustic transmitter and/or first and second acoustic receivers. The method 900 ends at block 917.

Figure 10:
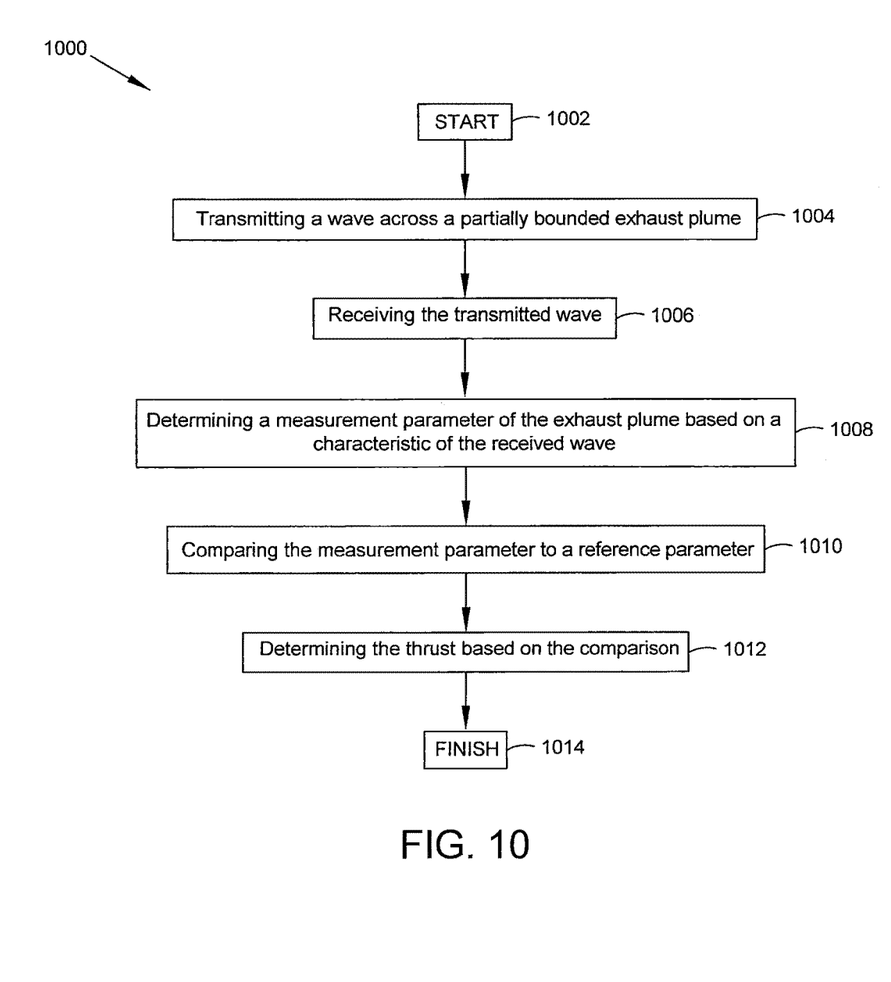
FIG. 10 is a flow diagram of a method in accordance with some embodiments of the present disclosure.

The present disclosure additionally provides a method 1000 of non-intrusively determining thrust in real time in a gas turbine engine having an exhaust plume that is at least partially bounded. The method 1000 begins at block 1002. At block 1004, a wave is transmitted across the partially bounded exhaust plume. The wave is received at block 1006. The transmitted wave may be a sound or a light. The step of receiving the wave may comprise receiving the transmitted wave at a plurality of receivers, with the receivers axially displaced from each other.

At block 1008 a measurement parameter of the exhaust plume is determined based on a characteristic of the received wave. The measurement parameter may be a function of the velocity of the exhaust plume, or may be a function of the velocity and temperature of the exhaust plume, or may be a function of the temperature of the exhaust plume. The characteristic of the received wave may be time of arrival, frequency, or refraction.

At block 1010 the measurement parameter is compared to a reference parameter. The reference parameter may be a prior measurement parameter, and may be a predetermined parameter, and may be a function of inlet velocity and/or inlet temperature.

At block 1012 the thrust is determined based on the comparison performed at block 1010.

The method 1000 ends at block 1014.

The terms non-intrusive and non-invasive are used interchangeably throughout this disclosure.

While embodiments of the disclosed subject matter are described with respect to acoustic waves, transmitters, and receivers, electromagnetic and other forms of transmission and reception are envisioned in other embodiments.

Although examples are illustrated and described herein, embodiments are nevertheless not limited to the details shown, since various modifications and structural changes may be made therein by those of ordinary skill within the scope and range of equivalents of the claims.

What is claimed is:

1. A non-intrusive thrust measurement system comprising:
   a boundary defining a passage along an axis adapted to contain a fluid flowing from upstream to downstream;
   an acoustic transmitter at said boundary;
   a receiver suite at said boundary and adapted to receive a transmission from the transmitter;
   a processor in communication with the transmitter and receiver suite adapted to determine a parameter from a characteristic of the transmission at the receiver suite and adapted to determine a thrust parameter from the parameter;

wherein the receiver suite comprises:

a first acoustic receiver at said boundary and adapted to receive a transmission from the acoustic transmitter;

a second acoustic receiver at said boundary and adapted to receive the transmission from the at least one acoustic transmitter;

wherein the characteristic determined by the processor is the time of arrival of the transmission at the first receiver and second receiver;

wherein the first and second acoustic receivers and the acoustic transmitter define a plane substantially parallel to the axis and wherein the second acoustic receiver is downstream from the first acoustic receiver and the first acoustic receiver is downstream from the acoustic transmitter.

2. The system of claim 1, wherein the acoustic transmitter operates at 40 khz and above.

3. The system of claim 1, wherein the processor is further adapted to compare the parameter to a baseline in determining the thrust parameter.

4. The system of claim 1, wherein the passage is a bypass flow.

* * * * *